US010752309B2

(12) United States Patent
Oste

(10) Patent No.: US 10,752,309 B2
(45) Date of Patent: Aug. 25, 2020

(54) BICYCLE WATER BOTTLE PHONE HOLDER

(71) Applicant: David Oste, Russell, KS (US)

(72) Inventor: David Oste, Russell, KS (US)

( * ) Notice: Subject to any disclaimer, the term of this patent is extended or adjusted under 35 U.S.C. 154(b) by 5 days.

(21) Appl. No.: 15/835,019

(22) Filed: Dec. 7, 2017

(65) Prior Publication Data

US 2018/0099713 A1    Apr. 12, 2018

Related U.S. Application Data

(63) Continuation-in-part of application No. 15/287,515, filed on Oct. 6, 2016, now abandoned.

(51) Int. Cl.
| | | |
|---|---|---|
| *B62J 9/00* | (2020.01) | |
| *B62J 11/00* | (2020.01) | |
| *B62J 45/10* | (2020.01) | |
| *A45F 3/16* | (2006.01) | |

(52) U.S. Cl.
CPC ............. *B62J 9/00* (2013.01); *B62J 11/00* (2013.01); *A45F 3/16* (2013.01); *B62J 45/10* (2020.02)

(58) Field of Classification Search
CPC ................ B62J 9/005; H04B 1/3888; A45F 2200/0508; A45F 2200/0583
USPC ......................................................... 224/414
See application file for complete search history.

(56) References Cited

U.S. PATENT DOCUMENTS

| | | | | |
|---|---|---|---|---|
| 4,260,086 A | * | 4/1981 | Hine, Jr. ................... | B62J 7/06 224/421 |
| 4,440,332 A | * | 4/1984 | Kullen ...................... | B62J 7/06 224/421 |
| 4,508,303 A | * | 4/1985 | Beckerer, Jr. .......... | A47G 23/02 211/75 |
| 4,596,370 A | * | 6/1986 | Adkins .................... | B62J 11/00 224/414 |
| 4,883,205 A | * | 11/1989 | Saelens ................... | B62J 11/00 224/414 |
| D342,869 S | * | 1/1994 | Fry ......................... | A47G 19/04 D7/620 |
| D346,489 S | * | 5/1994 | Bean ........................... | D12/407 |
| 5,423,509 A | * | 6/1995 | LaPorte ................... | B62J 11/00 224/414 |
| 5,427,285 A | * | 6/1995 | Kreitzman ............... | B62J 11/00 220/739 |

(Continued)

*Primary Examiner* — Nathan J Newhouse
*Assistant Examiner* — Lester L Vanterpool
(74) *Attorney, Agent, or Firm* — Lyman Moulton, Esq.; Moulton Patents, PLLC.

(57) ABSTRACT

A bicycle water bottle phone holder designed for a conventional bicycle cup holder on a frame of the bicycle. The bicycle phone holder includes a rigid frame and a flexible cover to allow cavitation and bulging of a volume thereof. The bicycle phone holder also includes at least one longitudinal flanging portion to receive a tabular personal digital assistant (PDA) device inside the elongate cup. The bicycle phone holder additionally includes a retaining wall and a cylindrical portion to receive one of a water bottle and personal effects inside the holder. An edge piping adjacent the flexible cover and the frame at an outside or inside the edges and features of the holder secure the two thereto. A funnel like design secures a cell phone above a cavity at the bottom of the holder, the cavity able to receive headphones, coins, tokens, jewelry, keys, wallets and purses.

18 Claims, 9 Drawing Sheets

(56) References Cited

U.S. PATENT DOCUMENTS

| | | | | |
|---|---|---|---|---|
| 5,745,565 A * | 4/1998 | Wakefield | | B60R 11/0241 |
| | | | | 379/446 |
| 5,772,066 A * | 6/1998 | Reynolds | | A45C 7/0063 |
| | | | | 220/23.83 |
| 5,803,328 A * | 9/1998 | Nakahara | | B62J 9/003 |
| | | | | 224/414 |
| 5,810,196 A * | 9/1998 | Lundy | | B44D 3/128 |
| | | | | 220/23.8 |
| D402,666 S * | 12/1998 | Golder | | D14/253 |
| 5,878,908 A * | 3/1999 | Foley | | A47J 19/2266 |
| | | | | 220/501 |
| 5,971,200 A * | 10/1999 | Reynolds | | A45C 7/0063 |
| | | | | 220/23.83 |
| 6,182,872 B1 * | 2/2001 | Six | | A45F 3/00 |
| | | | | 224/148.3 |
| 6,360,944 B1 * | 3/2002 | Gorman | | A47G 23/0225 |
| | | | | 220/738 |
| D458,723 S * | 6/2002 | Malvasio | | D32/53.1 |
| 6,719,192 B2 * | 4/2004 | Barcat | | A47G 19/04 |
| | | | | 220/23.4 |
| D522,241 S * | 6/2006 | Young | | D3/305 |
| 7,156,352 B2 * | 1/2007 | Cudney | | B44D 3/123 |
| | | | | 248/211 |
| 7,726,499 B2 * | 6/2010 | Williamson | | A47G 23/0241 |
| | | | | 215/396 |
| 7,802,767 B2 * | 9/2010 | Schaal | | B60R 7/04 |
| | | | | 220/737 |
| D677,151 S * | 3/2013 | Magniet | | B44D 3/128 |
| | | | | D9/424 |
| 8,522,917 B1 * | 9/2013 | Oh | | G10K 11/08 |
| | | | | 181/148 |
| 8,794,465 B2 * | 8/2014 | Okoniewski | | B60N 3/103 |
| | | | | 220/23.4 |
| 9,114,840 B1 * | 8/2015 | Turner | | B62J 11/00 |
| D755,448 S * | 5/2016 | McIntyre | | D30/131 |
| 9,326,587 B2 * | 5/2016 | Gronewoller | | A45F 5/021 |
| D761,511 S * | 7/2016 | Malvasio | | D32/53.1 |
| D790,989 S * | 7/2017 | Butler | | D9/761 |
| 10,005,404 B2 * | 6/2018 | Lupsan | | B60N 3/101 |
| 2002/0109062 A1 * | 8/2002 | Fowler | | B60N 3/103 |
| | | | | 248/311.2 |
| 2004/0099703 A1 * | 5/2004 | Schoenberger | | B60R 9/00 |
| | | | | 224/401 |
| 2007/0278122 A1 * | 12/2007 | McCumber | | B65D 81/3294 |
| | | | | 206/514 |
| 2009/0095765 A1 * | 4/2009 | Guard | | A47G 23/0225 |
| | | | | 220/739 |
| 2009/0212059 A1 * | 8/2009 | Chen | | A47J 41/0077 |
| | | | | 220/592.17 |
| 2009/0283178 A1 * | 11/2009 | Sun | | B67C 11/02 |
| | | | | 141/337 |
| 2010/0072198 A1 * | 3/2010 | Roemer | | H02G 3/185 |
| | | | | 220/3.3 |
| 2013/0075351 A1 * | 3/2013 | Lueker | | A47G 23/0208 |
| | | | | 211/26 |
| 2014/0124632 A1 * | 5/2014 | Bouse | | A47G 23/0225 |
| | | | | 248/205.1 |
| 2015/0069096 A1 * | 3/2015 | Kampas | | A45F 5/00 |
| | | | | 224/148.6 |
| 2015/0201779 A1 * | 7/2015 | Tittel | | A45F 3/20 |
| | | | | 220/731 |

* cited by examiner

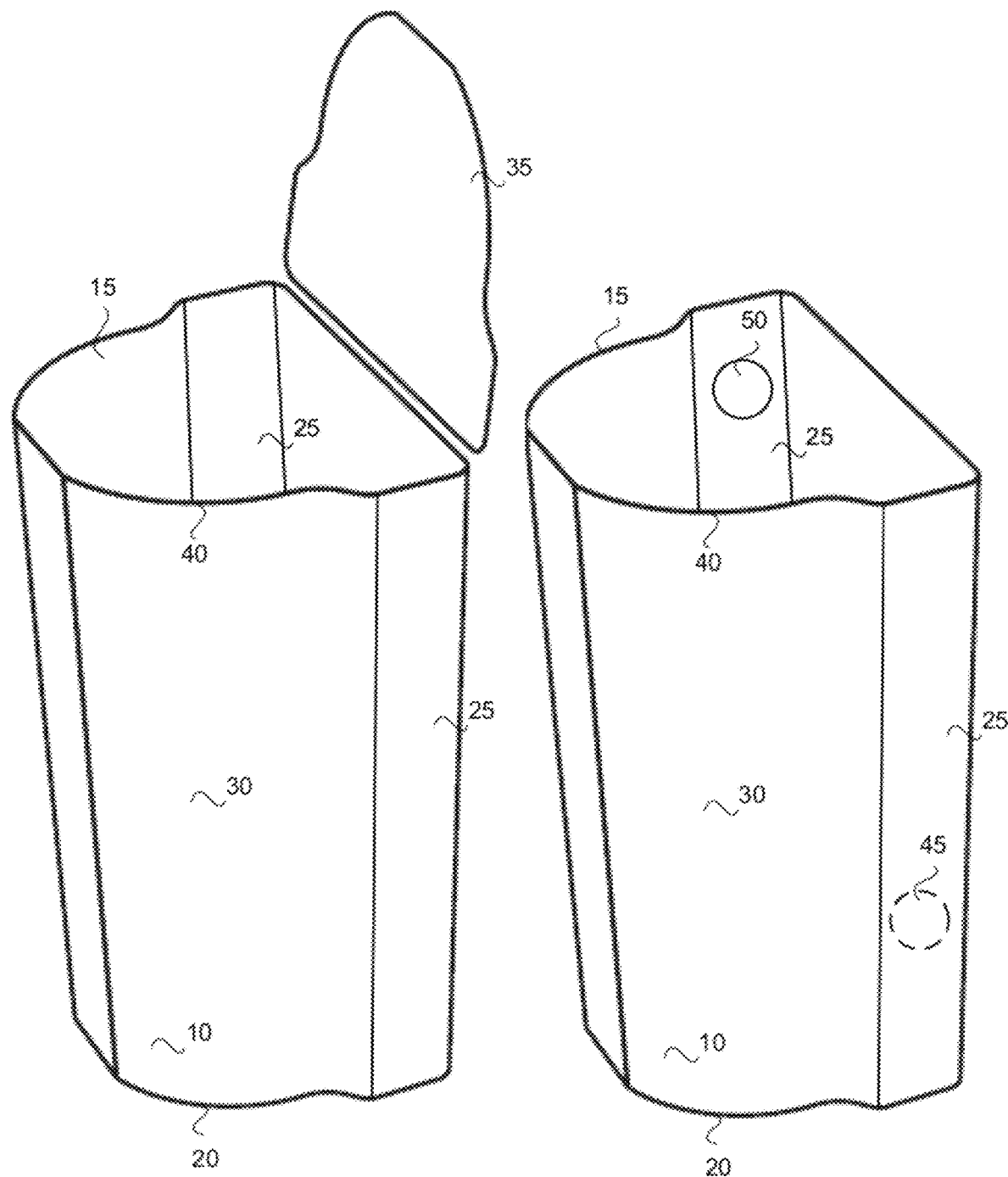

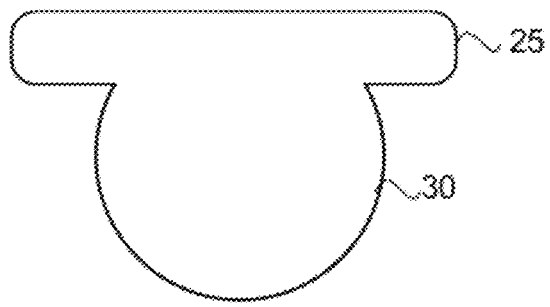 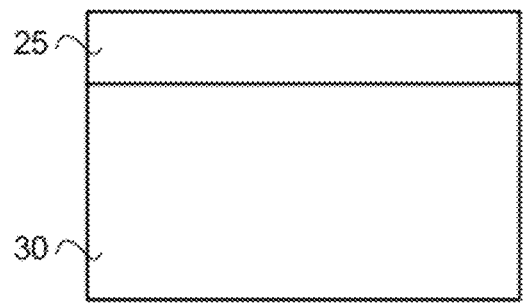
FIG. 8A  FIG. 8B
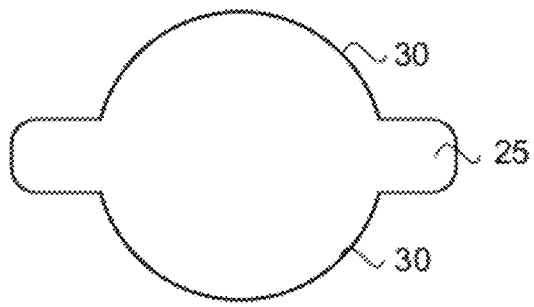 
FIG. 9A  FIG. 9B
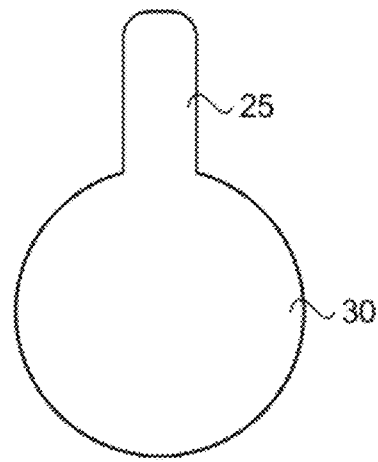 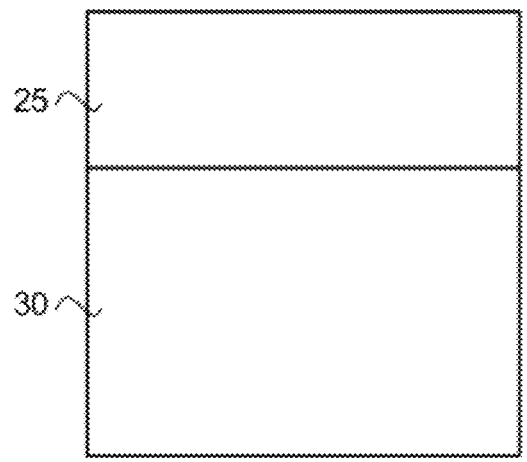
FIG. 10A  FIG. 10B

BICYCLE WATER BOTTLE PHONE HOLDER

CROSS-REFERENCE TO RELATED APPLICATION

This application claims the benefit of the priority date of earlier filed U.S. Non-Provisional patent application Ser. No. 15/287,515, titled 'A Bicycle Water Bottle Phone Holder,' filed Oct. 6, 2016 by Dave Oste, and is incorporated herein by reference in its entirety.

BACKGROUND OF THE INVENTION

Conventional cage water bottle holders are mounted to the frame of the bicycle or on the handle bars of the bicycle. Such cage water bottle holders are popular for holding water bottles and are often standard equipment for riders but are otherwise ineffective and unused for personal effects such as cell phones. After all, a cell phone would either slip right through a typical cage water bottle holder or bounce out of it all together and be lost or damaged.

On the other hand, conventional cell phone holders are designed and optimized to hold only a cell phone and have a separate mount to the bicycle where a rider can view the phone display. However, a rider is not always willing to spend the extra money and time required for the conventional cell phone holder. but may also not have a pocket for a phone in his riding gear. Also, conventional phone holders exposed to direct sunlight on a hot day allow a mobile phone to overheat and make the phone screen difficult to see and use.

Additionally, it is hard for the avid cyclist to find places for his or her keys, jewelry, wallet or purse and other personal effects otherwise carried in their pockets when not wearing a cycling outfit. There is therefore a long felt need in the market for an economical, secure and convenient bicycle water bottle phone holder that is also able to accommodate other personal effects.

SUMMARY OF THE INVENTION

A bicycle phone holder adapted to be received into a bicycle cup holder on a frame member of the bicycle is disclosed. The bicycle phone holder includes an open end and an end opposing the open end. The bicycle phone holder also includes at least one longitudinal flanging portion adapted to receive a tabular personal digital assistant (PDA) device inside the holder. The bicycle phone holder additionally includes a retaining wall between a cylindrical portion adapted to receive one of a water bottle and personal effects inside the elongate cup and the flanging portions. The tabular PDA device includes a cell phone, a tablet, a laptop and other electronic computing and telecommunications devices. A funnel like design of the disclosed bicycle water bottle phone holder secures a cell phone above a cavity at the bottom of the holder for personal effects.

A method for holding personal effects in a bicycle cup holder on a frame member of the bicycle is disclosed. The method includes providing a receptacle comprising an open end and an end opposing the open end. The method also includes configuring at least one longitudinal flanging portion of the receptacle to receive a tabular personal digital assistant (PDA) device and personal effects therein including head phones, earbuds, coins, tokens, jewelry, watches, keys, wallets and purses. The method additionally includes providing a cylindrical portion of the receptacle adapted to receive one of a water bottle and personal effects therein.

Other aspects and advantages of embodiments of the disclosure will become apparent from the following detailed description, taken in conjunction with the accompanying drawings, illustrated by way of example of the principles of the disclosure herein.

BRIEF DESCRIPTION OF THE DRAWINGS

FIG. 1 is a top side perspective view of a bicycle water bottle phone holder in accordance with an embodiment of the present disclosure.

FIG. 2 is a top side perspective view of a lidless bicycle water bottle phone holder in accordance with an embodiment of the present disclosure.

FIG. 8A is a top diagrammatic view of a webbed bicycle water bottle phone holder in accordance with an embodiment of the present disclosure.

FIG. 8B is a right side diagrammatic view of the webbed bicycle water bottle phone holder of FIG. 4A in accordance with an embodiment of the present disclosure.

FIG. 9A is a top diagrammatic view of a radial bicycle water bottle phone holder in accordance with an embodiment of the present disclosure.

FIG. 9B is a right side diagrammatic view of the radial bicycle water bottle phone holder of FIG. 5A in accordance with an embodiment of the present disclosure.

FIG. 10A is a top diagrammatic view of an extended bicycle water bottle phone holder in accordance with an embodiment of the present disclosure.

FIG. 10B is a right side diagrammatic view of an extended bicycle water bottle phone holder of FIG. 6A in accordance with an embodiment of the present disclosure.

Figure 3:
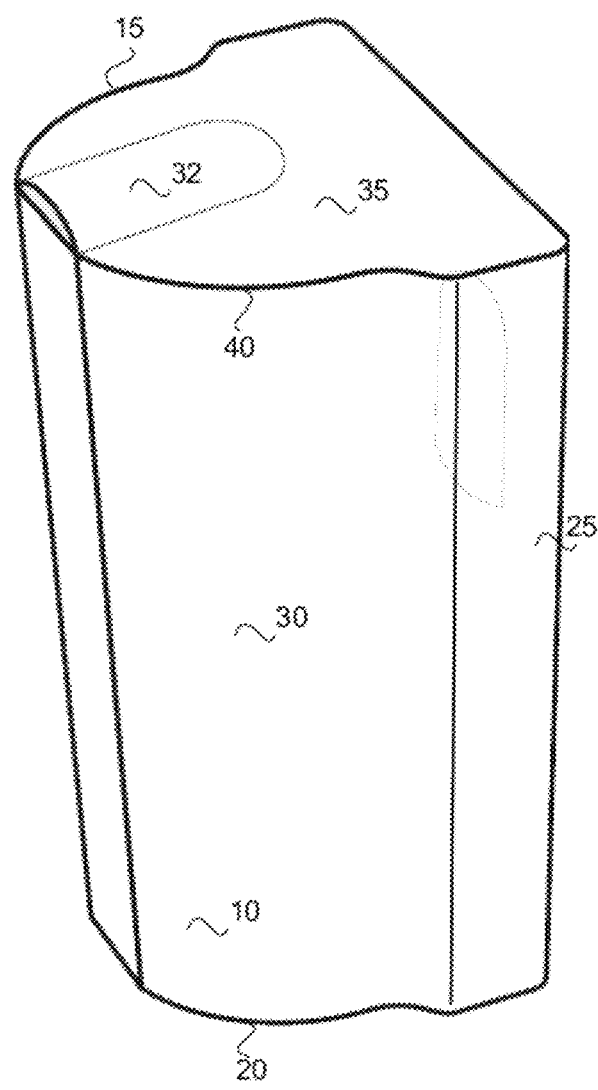
FIG. 3 is a top side perspective view of a bicycle water bottle phone holder with a closed lid in accordance with an embodiment of the present disclosure.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

Throughout the present disclosure, the term "holder" refers to any container object or device such as a cup, receptacle, housing, sheath, case, basket and cage that may be used to hold and carry something, particularly a personal digital assistant such as a cell phone, personal effects such as head phones, or a water bottle. The term 'frame' refers to a high durometer shell, skeleton, and uniframe for defining an outline of a volume therein. The skeleton frame may be a unibody component or comprise diametrical pieces or include edge components only. The term 'cover' refers to a flexible and sometimes fabric skin and inclusive boundary for the volume therein. The frame skeleton may be an exoskeleton, or an endoskeleton and the cover may be therefore inside the skeleton or outside the skeleton frame.

FIG. 1 is a top side perspective view of a bicycle water bottle phone holder in accordance with an embodiment of the present disclosure. A bicycle phone holder 10 adapted to be received into a bicycle cup holder on a frame member of the bicycle is disclosed. The bicycle phone holder 10 includes an open end 15 and an end 20 opposing the open end. The bicycle phone holder 10 also includes at least one longitudinal flanging portion 25 adapted to receive a tabular personal digital assistant (PDA) device inside the phone holder 10. The bicycle phone holder 10 additionally includes a cylindrical portion 30 adapted to receive one of a water bottle and personal effects such as head phones inside the phone holder 10. The tabular PDA device includes a cell phone, a tablet, a laptop and other electronic computing and telecommunications devices.

An embodiment of the bicycle water bottle phone holder 10 further comprises a form fitting lid 35 hinged along a portion of a rim 40 thereof. The phone holder 10 embodiment is configured in a funnel shape from a larger opening end 15 to a smaller opposing end 20 adapted to allow the tabular PDA device to stop short of a bottom of the cup and provide a gap for receiving other personal effects including keys, coins, tokens, jewelry, purses and wallets. Alternatively, bumps or other catching mechanisms may secure the cell phone in the bottom of the phone holder 10 and allow for personal effects to be placed around and above the cell phone underneath the lid 35.

FIG. 2 is a top side perspective view of a lidless bicycle water bottle phone holder in accordance with an embodiment of the present disclosure. At least one bump 45 inside the flanging portion(s) 25 may stop the cell phone from contacting the bottom of the phone holder 10 where other personal effects may be kept. The holder 10 may be made of a transparent material configured to have a small durometer and a uniform nominal thickness and allow a visual inspection of its contents. An embodiment of the at least one longitudinal flange 25 comprises a bump 50 configured to deform and pass the tabular PDA device into the longitudinal flange 25 and reform and retain it therein. The bump 50 may be hollow or it may comprise a low durometer material such as silicon and elastomers. Opaque materials are also included in embodiments for privacy and sun block considerations. Reference numbers same or similar to reference numbers depicted in other drawings may be used to illustrate same and similar limitations.

FIG. 3 is a top side perspective view of a bicycle water bottle phone holder with a closed lid in accordance with an embodiment of the present disclosure. Reference numbers same or similar to reference numbers depicted in other drawings may be used to illustrate same and similar limitations. Notably, a notch 32 allows for use of corded head phones or corded ear buds connected to a phone in the bicycle water bottle phone holder with the lid closed.

Figure 4:
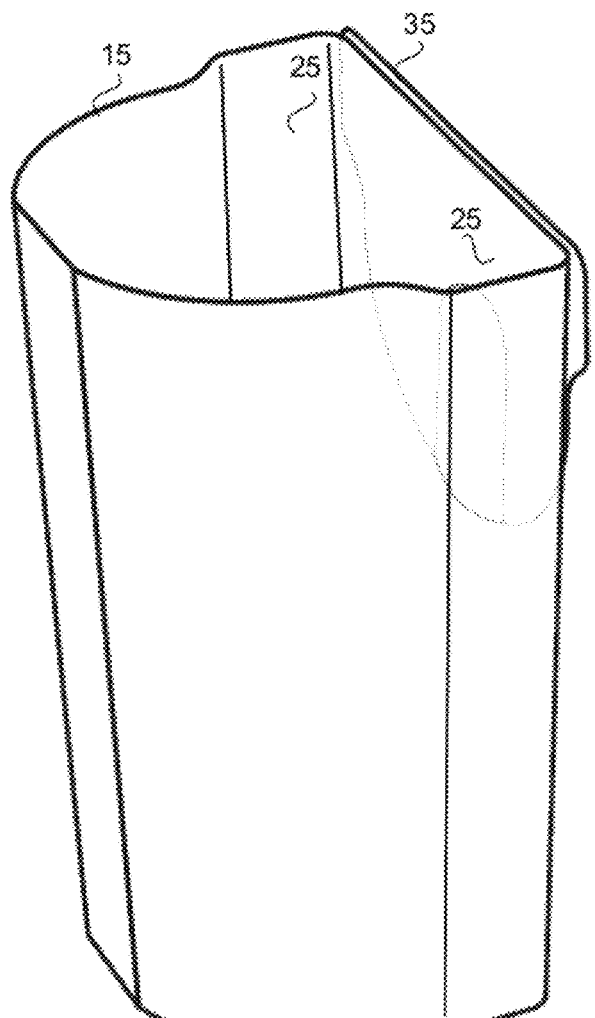
FIG. 4 is a top side perspective view of a bicycle water bottle phone holder with a flayed lid in accordance with an embodiment of the present disclosure.

FIG. 4 is a top side perspective view of a bicycle water bottle phone holder with a flayed lid in accordance with an embodiment of the present disclosure. Reference numbers same or similar to reference numbers depicted in other drawings may be used to illustrate same and similar limitations. The lid 35 is flayed back from the open end 15 along a webbing of the phone holder 10 between the two flanges 25 or the lid 35 may be completely removed in some embodiments.

Figure 5:
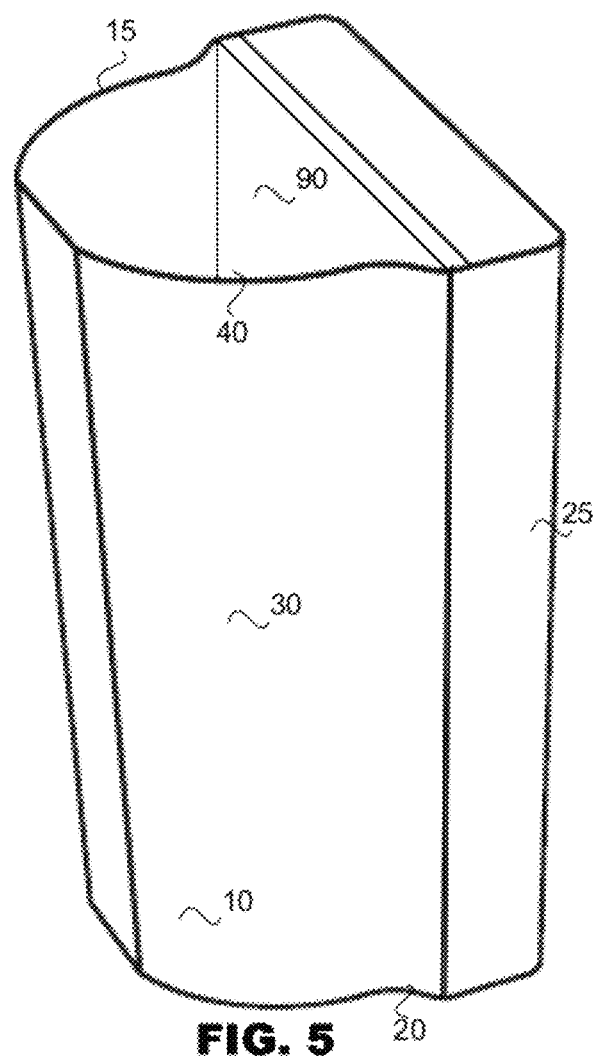
FIG. 5 is a top side perspective view of a lidless bicycle water bottle phone holder with a retaining wall in accordance with an embodiment of the present disclosure.

FIG. 5 is a top side perspective view of a lidless bicycle water bottle phone holder with a retaining wall in accordance with an embodiment of the present disclosure. Reference numbers same or similar to reference numbers depicted in other drawings may be used to illustrate same and similar limitations. Notably, a retaining wall 90 is disposed adjacent both flanges and is parallel the web (see FIG. 6, reference number 70) there between. The retaining wall 90 may separate a cell phone from personal effects held in the cylindrical portion 30 of the disclosed bicycle phone holder 10. The retaining wall 90 may be molded with the phone holder 10 or it may be inserted therein and removed based on user need. The retaining wall 90 may extend the complete length of the phone holder 10 or it may extend to a portion thereof. The retaining wall 90 may also define openings therein for finger placement to allow insertion and retraction of the retaining wall 90 and for other functions. The retaining wall 90 may be a high durometer semi-flexible plastic and it may also be a low durometer webbing material configured as an electrostatic shield for the phone.

Figure 6:
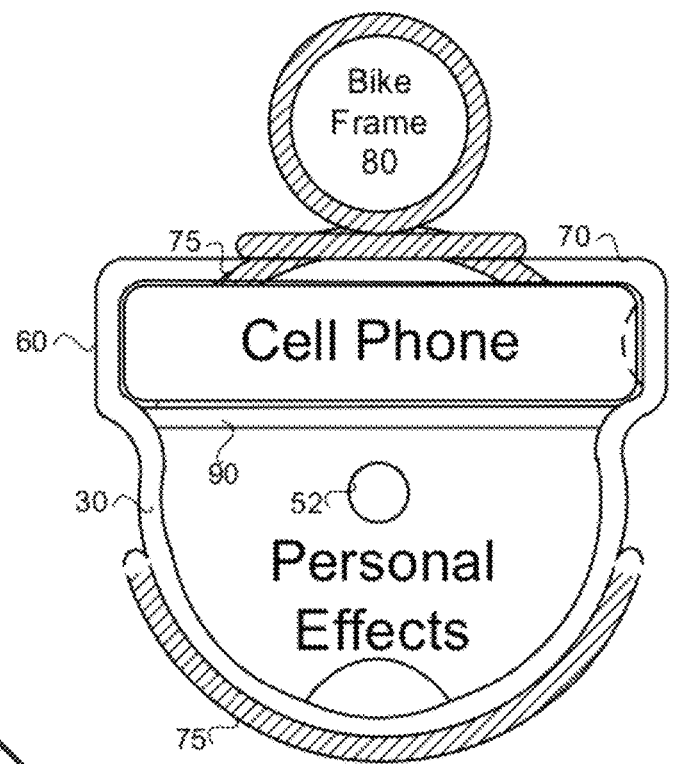
FIG. 6 is a top sectional view of the bicycle water bottle phone holder with a retaining wall including a cage holder and bike frame in accordance with an embodiment of the present disclosure.

FIG. 6 is a top sectional view of the bicycle water bottle phone holder with a retaining wall including a cage holder and bike frame in accordance with an embodiment of the present disclosure. Reference numbers same or similar to reference numbers depicted in other drawings may be used to illustrate same and similar limitations. Notably, the reference numbers of FIG. 7 below illustrate limitations which are the same or similar to the limitations illustrated in FIG. 6. The retaining wall 90 is depicted between the personal effects and the backwall 70 between the flanges. The cell phone may be retained in the phone holder 10 by the lid 35 (not depicted) or by one of the bumps 45 and 50 or it may be simply retained by gravity inside the phone holder 10. The hole(s) 52 defined in the bottom end of the phone holder may vary in size and number and use unlimited by the present disclosure. The hole 52 may drain water from the phone holder to protect electronic contents of the phone holder from damage.

Figure 7:
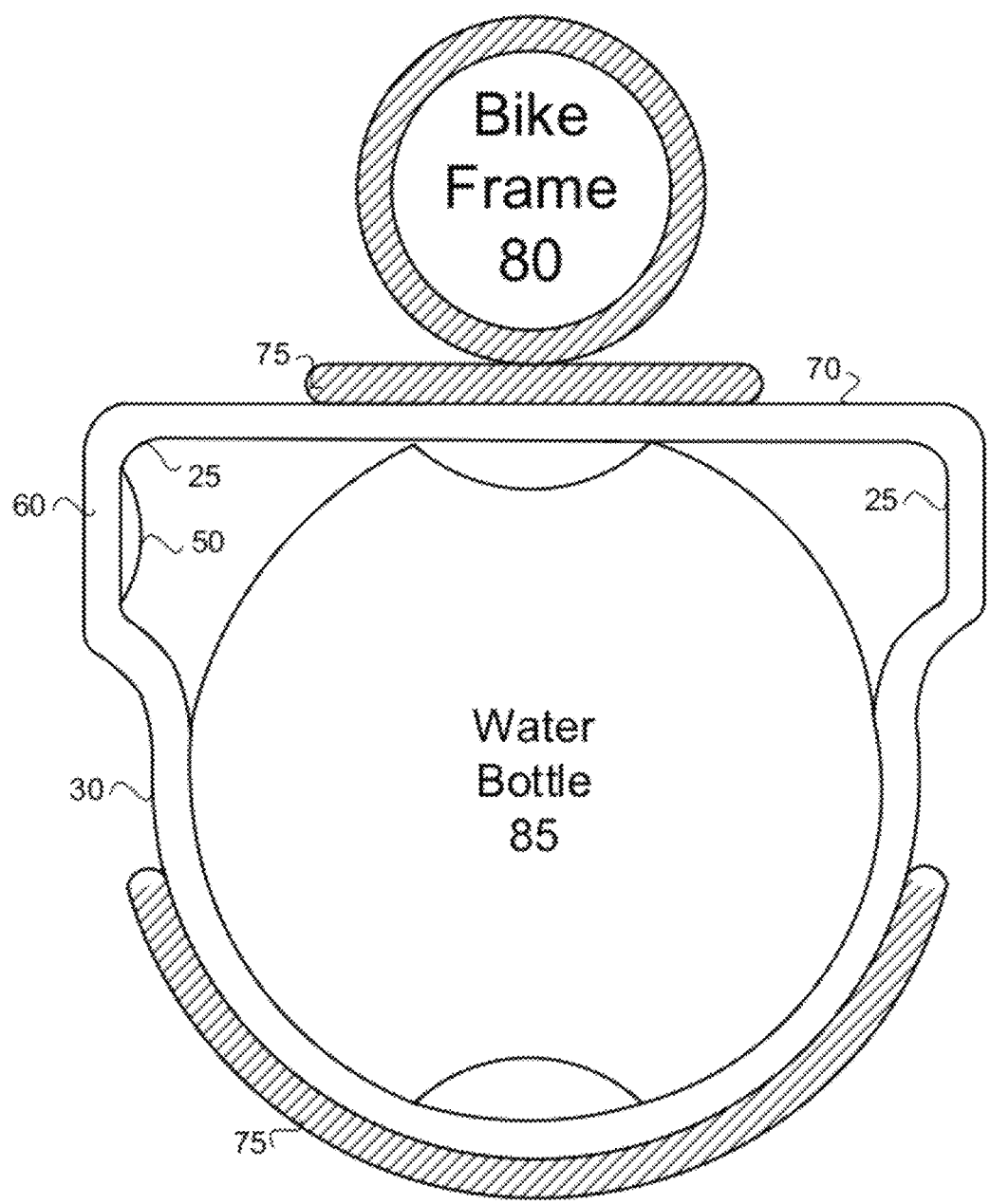
FIG. 7 is a top sectional view of the bicycle water bottle phone holder including a cage holder and bike frame in accordance with an embodiment of the present disclosure.

FIG. 7 is a top sectional view of the bicycle water bottle phone holder including a cage holder and bike frame in accordance with an embodiment of the present disclosure. The at least one longitudinal flanging portion 25 of the phone holder 10 comprises a first flat portion 60 parallel to a second flat portion 65 adapted to receive a flat side of the tabular PDA device. The at least one longitudinal flanging portion of the elongate cup also comprises a pair of flanging portions joined by a backwall 70 adapted to receive one of a face and a back of the tabular PDA device. The bicycle cup holder 75 is fixed to the bike frame 80 depicted in cross section and a water bottle 85 is depicted within the bicycle cup holder 75. A typical water bottle 85 is depicted inside the bicycle water bottle phone holder 10 and no cell phone is depicted therein. Depending on the size of the water bottle and the disclosed holder 10, a cell phone and a water bottle may be received therein at the same time.

FIG. 8A is a top diagrammatic view of a webbed bicycle water bottle phone holder in accordance with an embodiment of the present disclosure. The web between the two flanges may vary in size according to water bottle cage size and the design of the water bottle cage. Reference numbers same or similar to reference numbers depicted in other drawings may be used to illustrate same and similar limitations. Notably, the cylindrical portion 30 and the flanging portions 25 are made to define a shared mutually inclusive interior space there between.

FIG. 8B is a right side diagrammatic view of the webbed bicycle water bottle phone holder of FIG. 4A in accordance with an embodiment of the present disclosure. The present depiction illustrates the elongate cup configuration disclosed in the present application. Practical implementations include chamfered and rounded edges to facilitate plastic pultrusion and elastomer extrusion manufacturing. Reference numbers same or similar to reference numbers depicted in other drawings may be used to illustrate same and similar limitations. Flanging portions and cylindrical portions 30 corresponding to respective portions of FIG. 8A are depicted.

FIG. 9A is a top diagrammatic view of a radial bicycle water bottle phone holder in accordance with an embodiment of the present disclosure. This design works well with cage water bottle holder designs having radial apertures. Reference numbers same or similar to reference numbers depicted in other drawings may be used to illustrate same and similar limitations. Notably, the cylindrical portion 30 and the flanging portions 25 are made to define a shared mutually inclusive interior space there between.

FIG. 9B is a right side diagrammatic view of the radial bicycle water bottle phone holder of FIG. 5A in accordance with an embodiment of the present disclosure. At least one longitudinal flange comprises a pair of flanges disposed radially configured to comprise a flat portion adapted to receive an edge of the tabular PDA device. The disclosure includes an orifice defined in the bottom of the elongate cup for fluid drainage designed to keep the tabular PDA device dry in the event of condensation or leakage therefrom. The at least one longitudinal flange is configured to protrude from the cylindrical portion of the elongate cup to longitudinally receive the tabular PDA device. Reference numbers same or similar to reference numbers depicted in other drawings may be used to illustrate same and similar limitations. Flanging portions and cylindrical portions 30 corresponding to respective portions of FIG. 9A are depicted.

The disclosure also includes an elongate cup adapted to be received into a bicycle beverage holder on a frame member of the bicycle. The elongate cup comprises an open end and an opposing closed end. The elongate cup also includes a pair of longitudinal flanging portions adapted to receive a tabular personal digital assistant (PDA) device therein. The elongate cup additionally includes a cylindrical portion adapted to receive one of a water bottle and personal effects therein.

FIG. 10A is a top diagrammatic view of an extended bicycle water bottle phone holder in accordance with an embodiment of the present disclosure. Reference numbers same or similar to reference numbers depicted in other drawings may be used to illustrate same and similar limitations. The configuration of the bicycle frame cage may allow for the flanging portions 25 to extend singularly beyond the cylindrical portion. Notably, the cylindrical portion 30 and the flanging portion 25 are made to define a shared mutually inclusive interior space there between.

FIG. 10B is a right side diagrammatic view of an extended bicycle water bottle phone holder of FIG. 6A in accordance with an embodiment of the present disclosure. Reference numbers same or similar to reference numbers depicted in other drawings may be used to illustrate same and similar limitations. Flanging portions and cylindrical portions 30 corresponding to respective portions of FIG. 10A are depicted.

Figure 11:
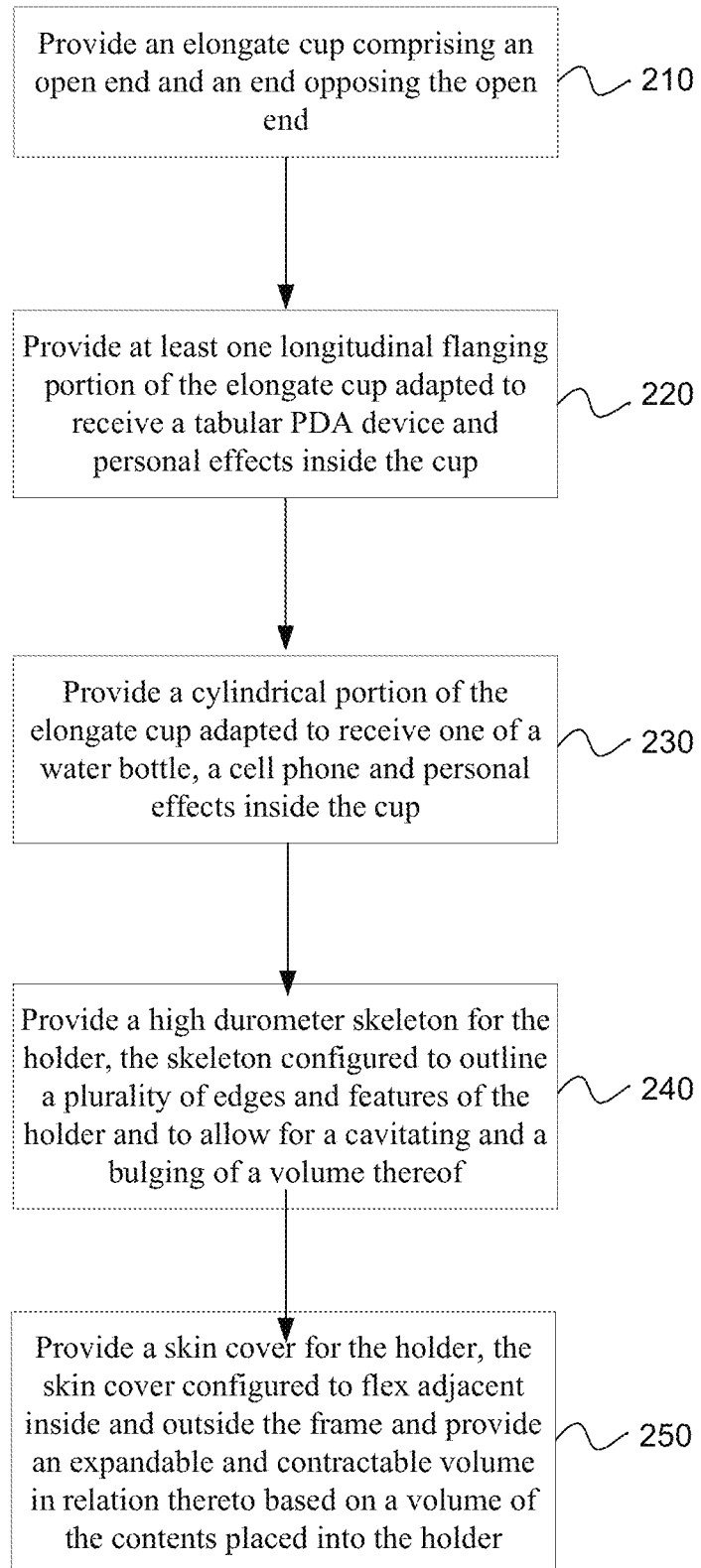
FIG. 11 is a flow diagram of a method for holding personal effects in a bicycle cup holder on a frame member of a bicycle in accordance with an embodiment of the present disclosure.

FIG. 11 is a flow diagram of a method for holding personal effects in a bicycle cup holder on a frame member of a bicycle in accordance with an embodiment of the present disclosure. The method includes providing 210 providing an elongate cup comprising an open end and an end opposing the open end. The method also includes providing 220 at least one longitudinal flanging portion of the receptacle to receive a tabular personal digital assistant (PDA) device and personal effects therein. The method additionally includes providing 230 a cylindrical portion of the receptacle adapted to receive one of a water bottle and personal effects therein. The method further includes providing 240 a high durometer skeleton for the holder, the skeleton configured to outline a plurality of edges and features of the holder and to allow for a cavitating and a bulging of a volume thereof. The method yet includes providing 250 a skin cover for the holder, the skin cover configured to flex adjacent inside and outside the frame and provide an expandable and contractable volume in relation thereto based on a volume of the contents placed into the holder.

Figures 12A, 12B:
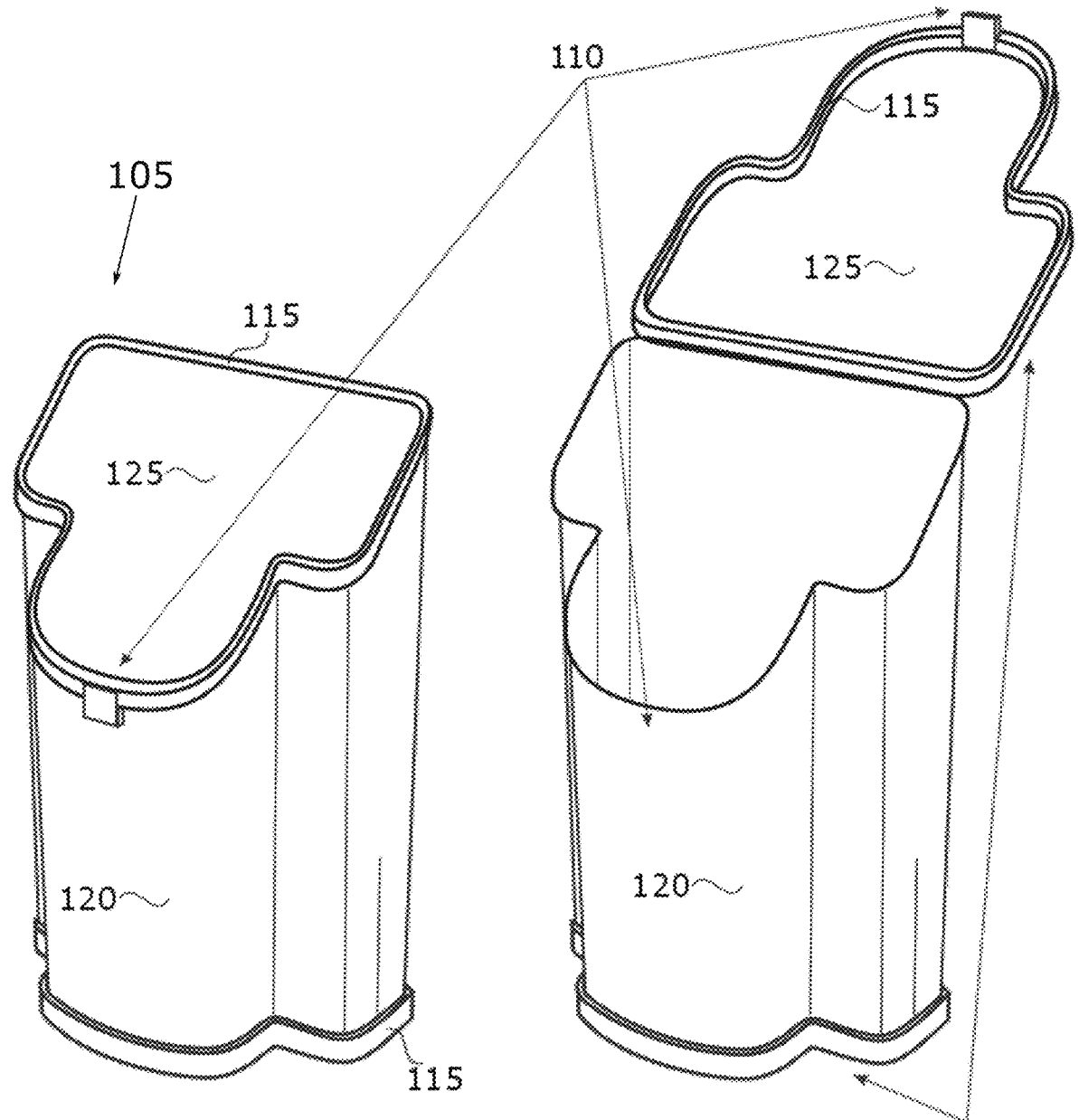
FIG. 12A depicts a closed lid soft sided fabric implementation of the bicycle water bottle phone holder in accordance with an embodiment of the present disclosure.
FIG. 12B depicts an open lid soft sided fabric implementation of the bicycle water bottle phone holder in accordance with an embodiment of the present disclosure.

FIG. 12A depicts a closed lid soft sided flexible or fabric implementation of the bicycle water bottle phone holder in accordance with an embodiment of the present disclosure. The depiction illustrates the soft sided flexible or fabric cover 105 implementation comprising the lid magnets 110, the edge piping 115, the soft sided fabric body 120 and the soft sided fabric lid 125. The magnets shown include a magnet disposed or sewn into the fabric lid and a complementary magnet disposed on or sewn into the fabric body or adjacent the body shell supporting the fabric body or adjacent an edge piping at the edge thereof.

FIG. 12B depicts an open lid soft sided fabric implementation of the bicycle water bottle phone holder in accordance with an embodiment of the present disclosure. The depiction illustrates the soft sided flexible fabric cover 105 implementation comprising the lid magnets 110, the edge piping 115, the soft sided fabric body 120 and the soft sided fabric lid 125. The magnets shown secure the fabric lid 125 to the fabric body 120 but other fasteners are used in embodiments such as snap fasteners, hook and loop fasteners, post and receptacle fasteners, etc. Also edge piping on the fabric lid 125 and complementary edge piping on the fabric body 120 are used to secure the fabric lid 125 to the fabric body 120. The edge piping 115 also provides a framework for a shape and function of the fabric cover.

Figure 13:
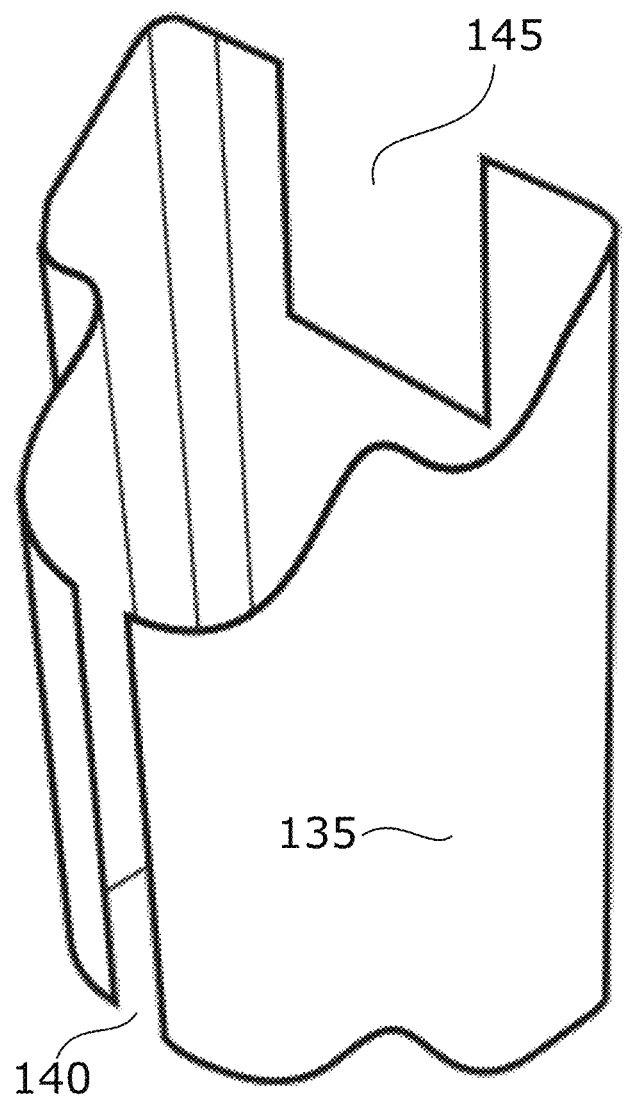
FIG. 13 depicts a high durometer shell for the soft sided fabric implementation of the bicycle water bottle phone holder in accordance with an embodiment of the present disclosure.

FIG. 13 depicts a high durometer shell for the soft sided fabric implementation of the bicycle water bottle phone holder in accordance with an embodiment of the present disclosure. The high durometer but flexible shell 135 comprises plastic, silicon, metals, graphites and hybrid composures thereof and other high durometer materials in embodiments. The flexible shell includes a body 135 and a first cutout 145 and a second cutout 140. The cutouts allow for cavitation and bulging of the soft fabric cover 120 (not depicted) into or away from a volume thereof. The cutouts also allow for a flexing of the soft sided (fabric) cover body and an expansion and contraction of a volume thereof, especially cutout 140 that runs or extends a height of the disclosure where the fabric cover 120 is also flexible and stretchable. The fabric cover 120 is put both outside the shell insert 135 and also put inside the shell insert 135 in embodiments of the present disclosure.

Figures 14A, 14B:
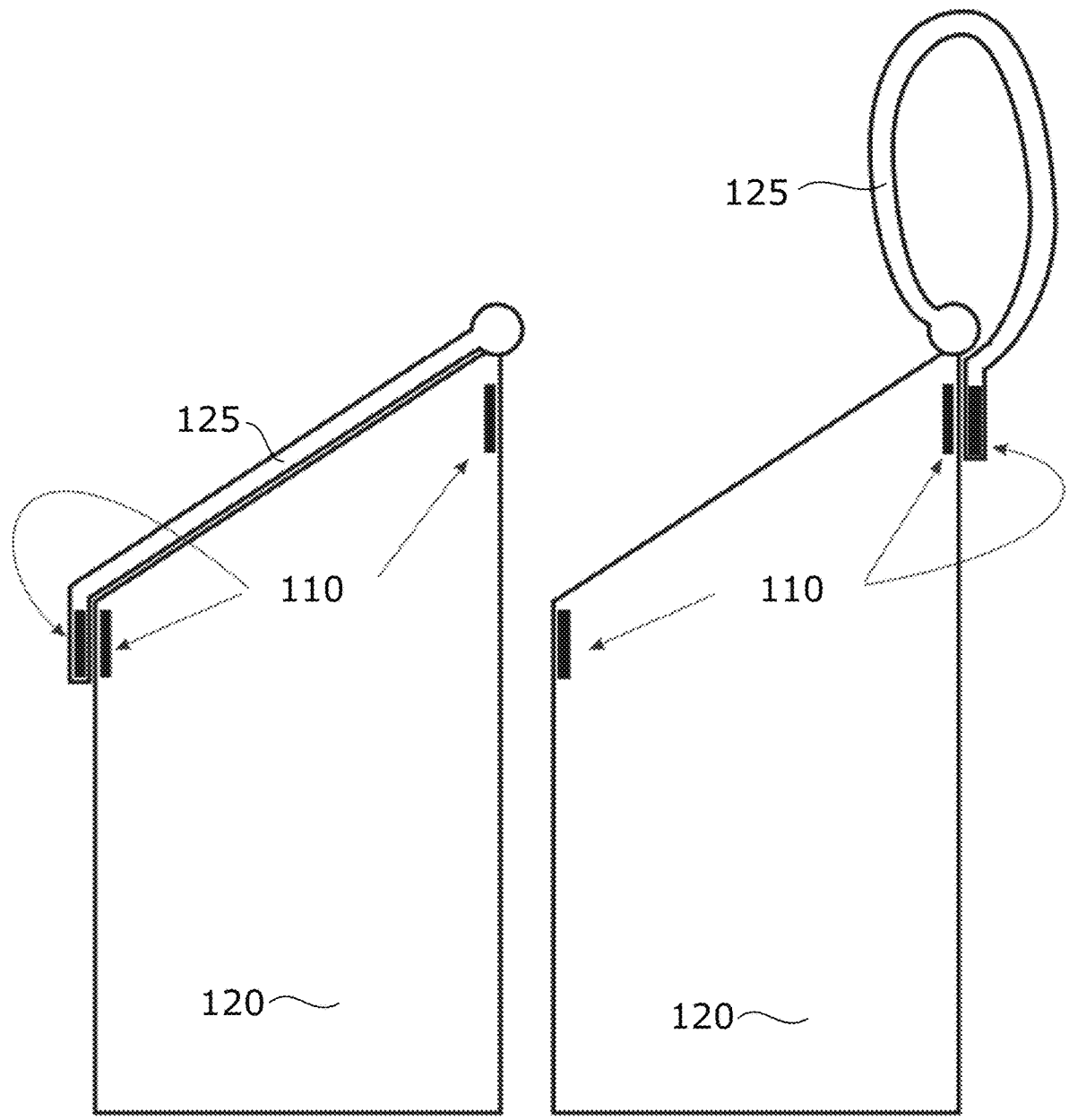
FIG. 14A depicts a cut away side view implementation including magnet placement for the secure closed position of the soft shell lid in accordance with an embodiment of the present disclosure.
FIG. 14B depicts a cut away side view implementation including magnet placement for the secure closed position of the soft shell lid in accordance with an embodiment of the present disclosure.

FIG. 14A depicts a cut away side view implementation including magnet placement for the secure closed position of the soft shell lid in accordance with an embodiment of the present disclosure. The complementary magnets 110 are aligned adjacently with a north/south respective polarity for a secure closure of the flexible and/or fabric lid 125 to the fabric body 120 and edge piping of the rigid undergirding.

FIG. 14B depicts a cut away side view implementation including magnet placement for the secure closed position of the soft shell lid in accordance with an embodiment of the present disclosure. The complementary magnets 110 are aligned adjacently with a north/south respective polarity for a secure opening of the fabric lid 125 to the fabric body 120. The fabric lid is looped in the depiction but a placement of the magnet on the fabric body 120 distal from the opening or mouth of the disclosure also allows a flat placement of the fabric lid 125 in the open position.

Therefore, the present disclosure satisfies the long felt need for an economical, secure and convenient bicycle water bottle phone holder that is also able to accommodate other personal effects. The disclosed non-handlebar mounted bicycle water bottle phone holder allows a rider to easily access the phone without stopping the bicycle. The disclosure also provides a safe, secure and functional space for a phone and personal effects apart from a rider's person, clothing and special dedicated mounts on a bicycle.

The disclosed bicycle phone holder may also be used as a mixer cup when a lid is included. Smoothies, mixes and solutions may be mixed by the travel actions of the bicycle in motion. Other uses of the disclosure may be claimed in subsequent patent applications in continuations, divisionals and provisional applications by the Applicant during or subsequent to prosecution of the present application.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. A bicycle phone holder adapted to be received into a bicycle bottle holder on a frame member of the bicycle, the bicycle phone holder comprising:
    a holder comprising an open end and an end opposing the open end;
    at least one longitudinal flanging portion of the holder adapted to receive a tabular personal digital assistant (PDA) device inside the holder;
    a cylindrical portion of the holder adapted to receive one of a water bottle and personal effects inside the holder, wherein the at least one longitudinal flanging portion is immediately adjacent the bicycle bottle holder on the frame member of the bicycle and a backwall thereof is opposite to and tangential with the cylindrical portion and together are configured to define a shared mutually inclusive interior space there between;
    at least one temporary and removable retaining wall disposed adjacent the at least one longitudinal flanging portion, the at least one temporary and removeable retaining wall configured to extend a length of the phone holder and to separate a personal digital assistant from the personal effects therein;
    a uniframe for the holder, the uniframe configured to outline a plurality of edges and features of the holder and to allow for a cavitation and a bulging of a volume thereof; and
    a flexible cover for the holder, the cover configured to flex adjacent inside and outside the uniframe and provide an expandable and contractable volume in relation thereto based on a volume of the contents placed into the holder.

2. The bicycle phone holder of claim 1, wherein the uniframe configured for the holder, comprises a first cutout running a height of the holder and a second cutout running a width of the holder to allow a respective width and height volume expansion thereof.

3. The bicycle phone holder of claim 1, further comprising a flexible and looping form fitting lid hinged along a portion of a rim of the holder, the lid having a raised notch at an edge thereof for connection access to a corded PDA regardless of a position of the lid.

4. The bicycle phone holder of claim 1, wherein the holder is configured in a funnel shape from a larger opening end to a smaller opposing end adapted to allow the tabular PDA device to stop short of a bottom of the holder and provide a gap for receiving other personal effects including keys, coins and tokens.

5. The bicycle phone holder of claim 1, wherein a single extended flanging portion extends radially from the cylindrical portion of the holder.

6. The bicycle phone holder of claim 1, wherein the at least one longitudinal flanging portion of the holder further comprises a pair of flanging portions which symmetrically extend beyond a diameter of the cylindrical portion and are joined by a flat webbing adapted to receive one of a face and a back of the tabular PDA device.

7. The bicycle phone holder of claim 1, wherein the at least one longitudinal flange comprises a pair of flanges disposed radially and each configured to comprise a flat portion adapted to receive an edge of the tabular PDA device.

8. The bicycle phone holder of claim 1, further comprising an edge piping disposed adjacent the flexible cover and the uniframe at an inside of the plurality of edges and features of the holder secures the flexible cover to the frame.

9. The bicycle phone holder of claim 1, wherein the at least one longitudinal flange is configured to protrude from the cylindrical portion of the holder to longitudinally receive the tabular PDA device.

10. A bicycle phone holder adapted to be received into a bicycle cup holder on a frame member of the bicycle, the bicycle phone holder comprising:
   an elongate cup comprising an open end and an opposing closed end;
   a pair of longitudinal flanging portions of the elongate cup adapted to receive a tabular personal digital assistant (PDA) device inside the elongate cup;
   a cylindrical portion of the elongate cup adapted to receive one of a water bottle and personal effects inside the elongate cup,
   wherein the pair of longitudinal flanging portions is immediately adjacent the bicycle cup holder and a common backwall thereof is opposite to and tangential with the cylindrical portion and together are configured to define a shared mutually inclusive interior space there between;
   a high durometer frame for the holder, the frame configured to outline a plurality of edges and features of the holder and to allow for a cavitation and a bulging of a volume thereof; and
   a flexible cover for the holder, the flexible cover configured to flex adjacent inside and outside the frame and provide an expandable and contractable volume in relation thereto based on a volume of the contents placed into the holder.

11. The bicycle phone holder of claim 10, wherein an inside of at least one longitudinal flange comprises a bump configured to deform and pass the tabular PDA device into the longitudinal flange and reform and retain it therein.

12. The bicycle phone holder of claim 10, wherein the elongate cup is configured in a funnel shape from a larger opening end to a smaller opposing end adapted to allow the tabular PDA device to stop short of a bottom of the cup and provide a gap for receiving other personal effects including keys, coins and tokens.

13. The bicycle phone holder of claim 10, wherein the longitudinal flanging portions of the elongate cup comprise a first flat portion parallel to a second flat portion, both the longitudinal flanging portions and the flat portions configured to symmetrically extend beyond a diameter of the cylindrical portion and adapted to receive a flat side of the tabular PDA device.

14. The bicycle phone holder of claim 10, wherein the longitudinal flanging portions of the elongate cup further comprise a pair of flanging portions joined by a flat webbing adapted to receive one of a face and a back of the tabular PDA device.

15. The bicycle phone holder of claim 10, further comprising an edge piping disposed adjacent the flexible cover and the uniframe at an outside of the plurality of edges and features of the holder secures the flexible cover to the uniframe.

16. The bicycle phone holder of claim 10, wherein the at least one longitudinal flange comprises a pair of flanges disposed radially and each configured to comprise a flat portion adapted to receive an edge of the tabular PDA device.

17. The bicycle phone holder of claim 10, wherein the at least one longitudinal flange is configured to protrude from the cylindrical portion of the elongate cup to longitudinally receive the tabular PDA device.

18. A method for holding personal effects in a bicycle cup holder on a frame member of a bicycle, the method comprising:
   providing a receptacle comprising an open end and an end opposing the open end;
   configuring at least one longitudinal flanging portion in the receptacle adapted to receive a tabular personal digital assistant (PDA) device and personal effects therein;
   providing a cylindrical portion of the receptacle adapted to receive one of a water bottle and personal effects inside the receptacle,
   wherein the at least one longitudinal flanging portion is immediately adjacent the bicycle cup holder and a backwall thereof is opposite to and tangential with the cylindrical portion and together are configured to define a shared mutually inclusive interior space there between;
   providing a high durometer skeleton for the holder, the skeleton configured to outline a plurality of edges and features of the holder and to allow for a cavitating and a bulging of a volume thereof; and
   providing a skin cover for the holder, the skin cover configured to flex adjacent inside and outside the frame and provide an expandable and contractable volume in relation thereto based on a volume of the contents placed into the holder.

* * * * *